United States Patent

Rockstedt

[11] Patent Number: 5,814,350
[45] Date of Patent: Sep. 29, 1998

[54] HOT-CUT PELLETIZER

[76] Inventor: Siegward Rockstedt, Haubstrasse 1, D-53426, Schalkenbach, Germany

[21] Appl. No.: 750,353
[22] PCT Filed: May 30, 1995
[86] PCT No.: PCT/EP95/02042
  § 371 Date: Dec. 6, 1996
  § 102(e) Date: Dec. 6, 1996
[87] PCT Pub. No.: WO95/33609
  PCT Pub. Date: Dec. 14, 1995

[30] Foreign Application Priority Data

Jun. 6, 1994 [DE] Germany .................. 44 19 786.1

[51] Int. Cl.$^6$ ....................................... B29B 9/06
[52] U.S. Cl. .................. 425/67; 264/142; 264/143; 425/313
[58] Field of Search ................. 425/306, 310, 425/311, 313, 67, 307; 264/142, 143

[56] References Cited

U.S. PATENT DOCUMENTS

| 3,295,469 | 1/1967 | Vassalli | 425/313 |
| 3,415,917 | 12/1968 | Watanabe et al. | 425/313 |
| 3,792,950 | 2/1974 | Cuff | 425/313 |
| 4,245,972 | 1/1981 | Anders | 425/313 |
| 4,285,652 | 8/1981 | Anders | 425/311 |
| 4,300,877 | 11/1981 | Anderson | 264/142 |

*Primary Examiner*—Jay H. Woo
*Assistant Examiner*—Joseph Leyson
*Attorney, Agent, or Firm*—Banner & Witcoff, Ltd.

[57] ABSTRACT

The invention relates to a hot-cut pelletizer for thermoplastics having a housing which is designed as a hollow rotational body and the interior space of which is supplied with polymer melt, which is forced through channels passing radially through the housing wall and is cut into pellets by cutters which rotate in a substantially water-free space and slide over the openings of the channels along a cutting face running around the housing wall. The housing wall is surrounded by a ring of stationary cooling water nozzles, which direct cooling water jets onto the cutters in the manner of a jacket over the cutting face at such a small radial distance from the latter that the polymer melt is thereby chilled directly after leaving the cutting face and at the same time the cutters are cooled up to the cutting edges by the cooling water with the pellets being flung out radially.

5 Claims, 3 Drawing Sheets

HOT-CUT PELLETIZER

FIELD OF THE INVENTION

The invention relates to a hot-cut pelletizer for thermoplastics, having a housing which is designed as a hollow rotational body and the interior space of which is supplied with polymer melt, which is forced through channels passing radially through the housing wall and is cut into pellets by cutters which rotate in a substantially water-free space and slide over the openings of the channels along a cutting face running around the housing wall.

BACKGROUND OF THE INVENTION

Such a hot-cut pelletizer is described in German Offenlegungsschrift 1,454,753. The rotational body used in this pelletizer is of a conical design, there opening out at its conical surface radially directed channels for the passage of polymer melt, which is cut up into pellets by cutters passing over the surface. In the publication, reference is made with respect to the cooling of the pellets to the possibility of accomplishing this cooling by liquid sprayed onto the pellets or by air. Particular attention is paid to a special type of air cooling, which consists in providing fan blades which rotate with the cutters and produce an air stream, which additionally accelerates the pellet particles flung outward by the centrifugal action of the cutters. This is intended to achieve the effect that the pellets sliding off the cutters are directed onto the fan blades without impact, that is to say do not strike hard against the fan blades, the pellets being cooled by the air flow produced by the blades. Additional cooling is accomplished by the fact that in the region of the fan blades there are provided outlet openings for a cooling liquid, through which liquid is directed onto the fan blades and forms a protective film on them and on the inside wall of a collecting housing surrounding the hollow rotational body with the cutters. The outlet openings for the cooling liquid are arranged in the vicinity of the cutting edges of the cutters. Owing to the centrifugal force acting on the cooling liquid, the region of the cutters lying between the cutting edges of the cutters and the outlet openings consequently remain free from cooling liquid, since the latter immediately flows off radially outward over the fan blades on account of the rotation of the cutters and of the outlet openings. Cooling of the cutting edges particularly exposed to heating and of the regions directly adjacent thereto is thus not possible in this way, which on the one hand does not adequately protect the cutting edges against overheating and on the other hand significantly increases the risk which always exists during hot cutting that pellets will remain adhering directly to the cutting edges, initially still in a molten state and not cooled at all directly at the outlet from the rotational body, owing to the water being radially flung out there. It therefore tends to smear over the rotational body. Some types of plastic cannot be pelletized in this way. Therefore, a practical implementation of this known hot-cut pelletizer has not become known.

Also disclosed, by U.S. Pat. No. 3,792,950, is an underwater pelletizer, in which there rotates around the outer face of a cylinder passed through by radial polymer dies in a pelletizer housing filled with cooling water a cutter plate with cutters passing over the polymer dies. The filling of the pelletizer housing with cooling water in this case takes place via a ring nozzle, which is formed by the outer face of the cylinder and the inner face of the cutter plate and introduces into the interior of the pelletizer housing a stream of cooling water along the outer face of the cylinder with the polymer dies. This stream of cooling water is used not only to fill the interior space of the pelletizer housing but also to rinse away from the polymer dies the pellets just cut, which then leave together with the cooling water through an outflow fitted onto the pelletizer housing in the manner of a flue. The intensive and direct rinsing over of the outer face of the cylinder with the polymer dies by the cooling water results in corresponding cooling in the region of the polymer dies, which may cause them to freeze, putting continuous pelletizing operation at risk.

SUMMARY OF THE INVENTION

The invention is based on the object of designing the cooling of the pellets and the cutters in such a way that this cooling acts on the cutters up to their cutting edges and consequently cools the pellets superficially directly after they leave the channels, without this cooling being able to have a significant effect on the cutting face with its openings of the channels for the polymer melt. According to the invention, this takes place by the housing wall being surrounded by a ring of stationary cooling water nozzles, which direct cooling water jets onto the cutters in the manner of a jacket over the cutting face at such a small radial distance from the latter that the polymer melt is thereby chilled directly after leaving the cutting face and at the same time the cutters are cooled up to the cutting edges by the cooling water with the pellets being flung out radially.

On account of this design, the cooling water jets form a type of stationary cooling water jacket, which surrounds the cutting face at a small distance and powerfully hits the cutters, so that they are subjected to intensive cooling. The cooling water is in this case swirled by the rotating cutters, washing over the cutters as a whole up to the cutting edges and thereby also including the emerging polymer melt and the cut pellets, making it no longer possible for the pellets to stick to the cutters and the other components of the apparatus. In this case, the cooling water jacket impinges on the polymer melt emerging from the openings of the channels even before a cutter makes contact, the melt consequently being cooled directly after leaving the channels. This is of particular importance for thermoplastics, which tend to smear and stick during pelletizing. The cooling water rebounding from the cutters and the pellets onto the cutting face is immediately scraped off the surface as it were by the rotating cutters, so that it can exert virtually no cooling effect on the housing wall with the channels for the polymer melt. This is of decisive importance for the function of the hot-cut pelletizer, because any cooling in the region of the cutting face of the housing wall may have the consequence of so-called freezing of the channels and consequently their clogging with solidified polymer. In the case of the hot-cut pelletizer according to the invention, because of the cooling water jacket closely surrounding the housing wall, the cooling is extended up to the cutting edges of the cutters, which are subjected to considerable friction and consequently heating on account of the sliding of the cutters over the cutting face, and without cooling this heating may be so great that the cutters burn up during operation. The cooling water, which in this case unavoidably also wets the cutting face, cannot however act in the sense of posing a risk of freezing of the channels since, as stated, a cooling water film forming on the cutting face is immediately scraped off by the rotation of the cutters.

The cutting face of the housing wall is advantageously of a cylindrical design, since in this case there can form a cylindrical jacket of cooling water jets, which in this form extends particularly uniformly over the entire axial length of the cutting face, without at the same time having to be compressed or expanded in its jacket cross section.

To keep the shell of the housing at the relatively high temperature required for the passing through of the polymer melt, expediently electric heating cartridges are used, which can be fitted in an axial direction between the channels into the housing wall. With electric heating cartridges, particularly intensive heating of the hollow rotational body in the region of the cutting face can be achieved. The heating of the housing wall by means of axial bores arranged between the channels is known from the abovementioned German Offenlegungsschrift 1,454,753.

To be able to achieve as a high a throughput as possible with the pelletizer according to the invention, there are expediently provided next to the heating cartridges in each case a plurality of channels lying substantially axially one behind the other.

A particularly compact jacket of cooling water can be achieved by the cooling water jets being combined to form an annular clearance. In this case, immediately after the cooling water leaves the annular clearance there forms a compact jacket of cooling water, by which, if necessary, the intensity of the cooling can be further increased.

DESCRIPTION OF THE DRAWINGS

Exemplary embodiments of the invention are represented in the figures, in which.

DETAILED DESCRIPTION OF THE PREFERRED EMBODIMENTS

Figure 1:
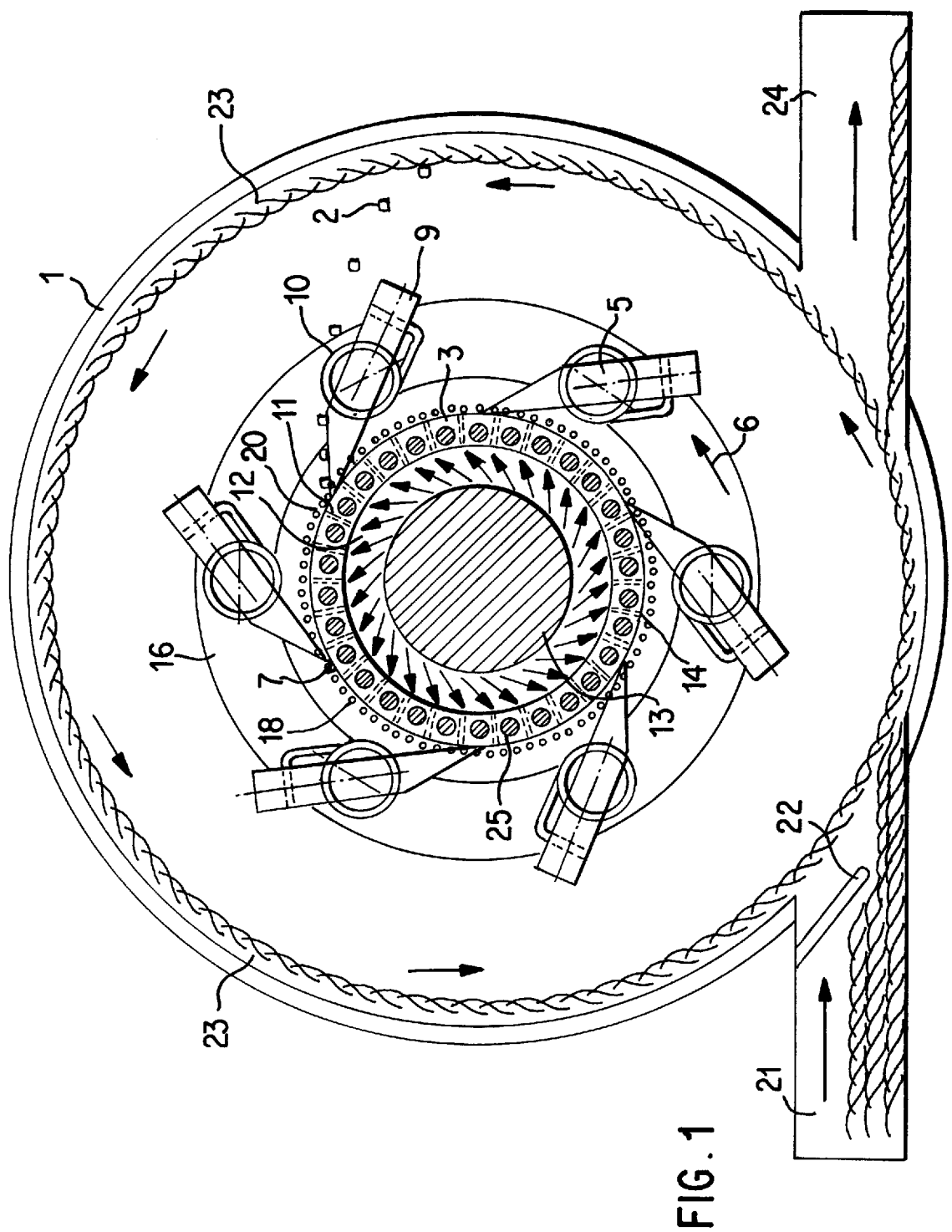
FIG. 1 shows a section through the hot-cut pelletizer along the line II—II from FIG. 2.
Figure 2:
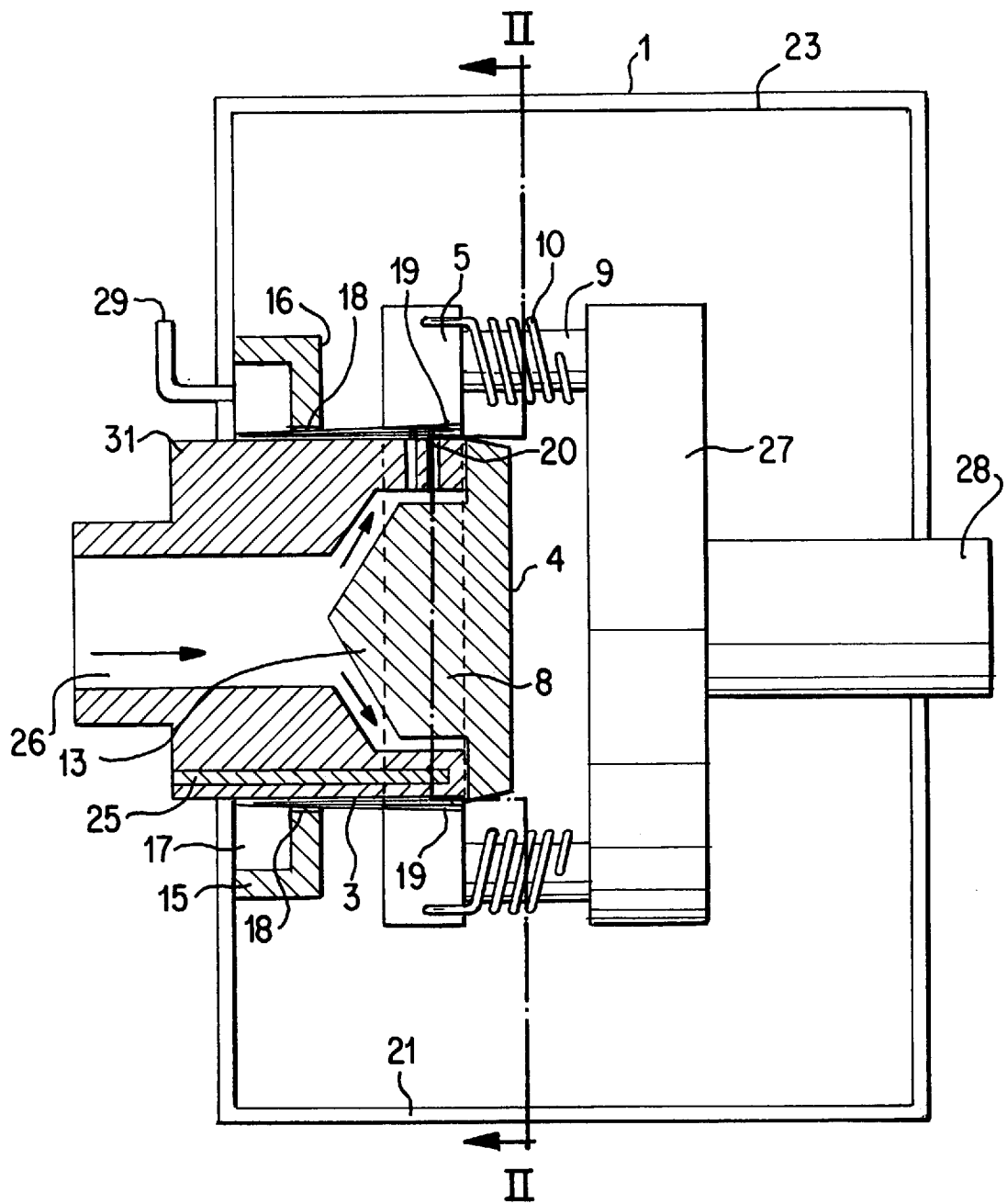
FIG. 2 shows a side view of the same apparatus, FIG. 3 show a modification of the design according to FIG. 1 with an annular clearance for the supplying of the cooling water.

FIG. 1 shows as a section along the line II—II from FIG. 2 a catching container 1 for the pellets, represented by 2, produced by the hot-cut pelletizer located therein. The hot-cut pelletizer comprises the cylindrical housing 31 (see FIG. 2), designed as a hollow rotational body, with the housing wall 3 and the housing plate 4, which can been seen from FIG. 2 and terminates the housing 31 at the end face. Cutters 5 rotate in the direction of the drawn-in arrow 6 around the housing wall 3, the cutters sliding with their cutting edge 7 over the surface of the housing wall 3. In the region which is slid over by the cutting edges 7, the housing wall 3 forms a cutting face 8, which is drawn in in FIG. 2 and is bounded by the dotted lines drawn in there. The cutters 5 are driven by a rotor (shown in FIG. 2), which will be described in more detail in connection with FIG. 2. The cutters 5 are rotatably mounted on the cutter spindles 9 and are pressed with their cutting edges 7 against the housing wall 3 by the helical springs 10 surrounding the cutter spindles 9. The housing wall 3 is passed through by radially running channels 11, into which polymer melt is forced from the interior space 12 of the housing. The interior space 12 contains a manifold core 13, as is usually arranged ahead of outlet dies of an extruder. The supplying of the polymer melt to the interior space 12 is not described in any more detail in this connection, since it involves known apparatus parts, such as in particular an extruder. In this connection, reference should also be made to the abovementioned German Offenlegungsschrift 1,454,753. On account of the cutting edges 7 sliding over the housing wall 3 in the region of the cutting face 8, polymer melt emerging from the openings 14 of the channels 11 is cut up directly after leaving the openings 14 into pellets 2, which are then flung outwards in the direction of the inner surface of the catching container 1 on account of the centrifugal force imparted to them by the rotating cutters 5.

In FIG. 1 there are also drawn in the electric heating cartridges 25, which are arranged in axial alignment between the channels 11. By means of the heating cartridges, the required heating is supplied to the housing wall 3.

As can be seen in particular from FIG. 2, arranged at the rear end of the housing wall 3 is a water chamber 15, of which only the front side 16 can be seen in FIG. 1. The water chamber 15 contains a water reservoir 17, which leads to cooling water nozzles. These cooling water nozzles 18 are arranged and directed such that they produce cooling water jets which run over the housing wall 3 and consequently the cutting face 8 in the manner of a jacket and maintain a small radial distance of about 0.5 mm from the cutting face 8. As FIG. 1 shows, for this purpose the cooling water nozzles 18 are arranged around the housing wall 3 in the manner of a ring in the front side 16. In this way, a thin, but intensive cooling water stream is produced in the form of a round cooling water jacket, which concentrically surrounds the housing wall 3 but maintains the mentioned small distance from the latter. The cooling water jets 18 in this case lie so closely together that virtually a closed jacket is obtained.

The cooling water jets, which can be seen in particular from FIG. 2, hit both the polymer melt in the form of the short strands 20, after they leave the openings 14, and the cutters 5, so that initially these short strands 20 are chilled at their surface and, in addition, the cutters 5 receive intensive cooling by the cooling water hitting them. The cooling water is thereby swirled by the cutters 5 and in this way reaches all the regions of the cutters 5 up to their cutting edges 7 and, in addition, of course also pellets 2 flung out by means of the cutters 5. The cooling water thereby sprayed also onto the cutting face 8 of the housing wall 3 can wet the cutting face 8 only for a very short time, since it is immediately scraped off as it were from the cutting face 8 by means of the cutting edges 7 and consequently rendered ineffective regarding an effect on the housing wall 3. This water flows off over the cutters 5 and is further flung against the inner face of the catching container 1 on account of the centrifugal force imparted to it.

To prevent an accumulation of pellets at the bottom of the catching container 1 and to transport the pellets out of the latter, the water inflow 21 is provided, into which the constricting wall 22 protrudes in such a way as to produce a high-speed water jet, which as it were shoots into the catching container 1 and thereby forms a fast-flowing water ring 23 on the inner wall of the latter. The water thereby accumulating at the bottom of the catching container 1 likewise flows off at considerable speed through the water outflow 24, which is arranged axially offset with respect to the water inflow 21, so that there is initially produced the above-mentioned water ring 23, which runs in the form of a helix and finally flows off through the water outflow 24. In this case, this flowing water takes with it the pellets taken up by it and carries them away via the water outflow 24.

It can be seen from FIG. 2 how the polymer melt is supplied to the apparatus. For example, it passes from an extruder into the supply channel 26, from which it is fed outward by means of the manifold core 13, where it passes into the interior space 12. From here, it is then forced through the channels 11 in the way described in connection with FIG. 1. In FIG. 2, the heating cartridges 25 fitted into the housing wall 3 are also drawn in.

The cutter spindles 9 for the individual cutters 5 are fastened on the cutter rotor 27 which is seated on the drive shaft 28. Drive shaft 28 and housing wall 3 are arranged coaxially with respect to each other, so that the cutters 5 can rotate around the housing wall 3 without colliding with it. The drive of the drive shaft 28 may take place by means of any known drive, in particular an electric motor.

To fill with cooling water the water chamber 15 with its water reservoir 17, the water connection 29 is provided, which is connected to any water source under pressure. The cooling water supplied to the water reservoir 17 in this way then leaves through the cooling water nozzles 18 on the front side of the water chamber 15, the arrangement of the cooling water nozzles 18 as a close ring having the consequence of producing a compact jacket of cooling water jets 19, which extend coaxially over the housing wall 3, maintaining the mentioned small distance from the housing wall, whereby direct contact between the cooling water jets 19 and the housing wall 3 is avoided.

Figure 3:
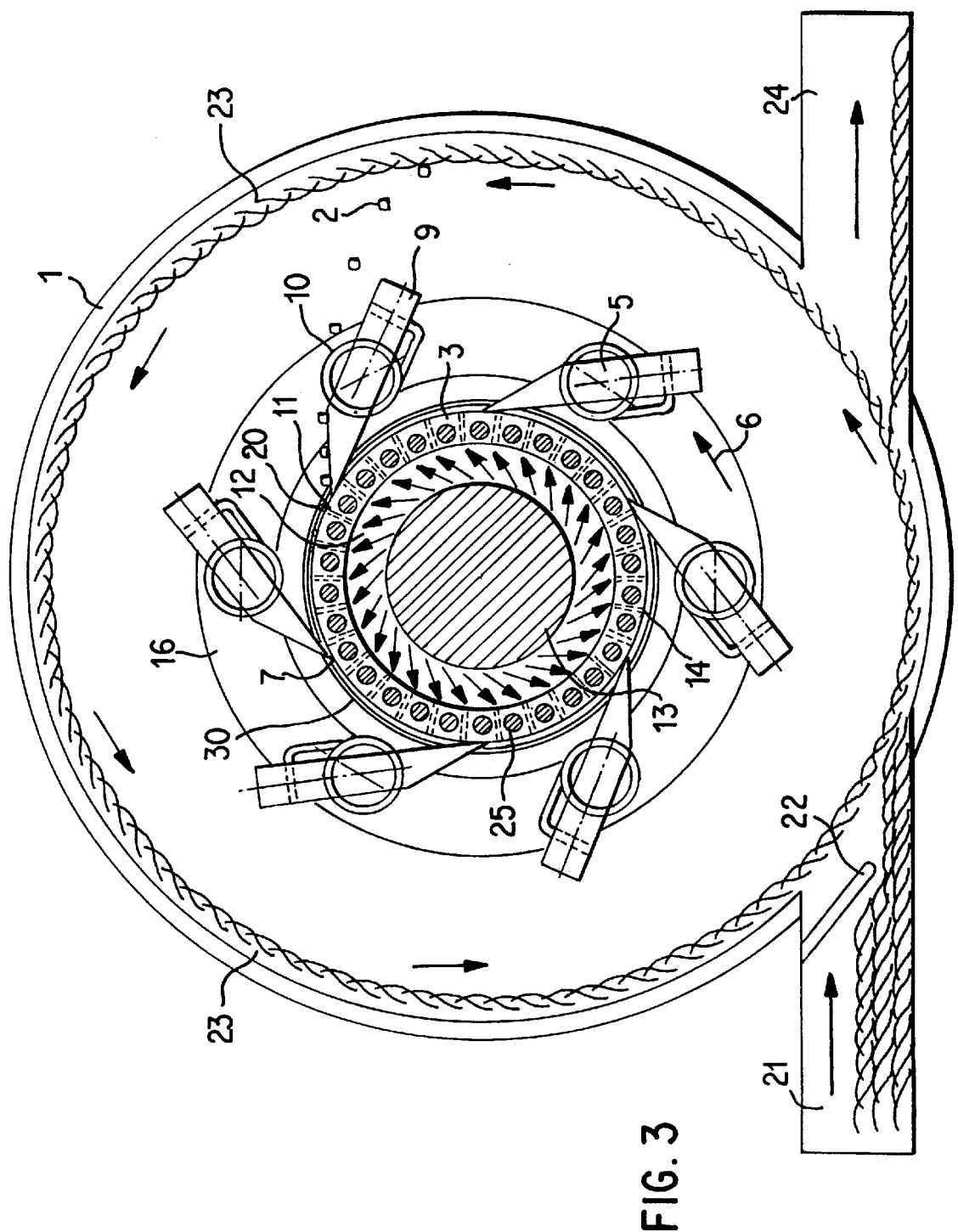

In FIG. 3, a modification of the design of the cooling water jacket is shown. The cooling water nozzles are combined here to form the ring nozzle 30, which is machined into the water chamber 15 as a narrow clearance. With this arrangement, a closed cooling water jacket with a correspondingly intensive cooling action is produced directly after the point where the cooling water leaves the front side 16 of the water chamber 15.

I claim:

1. A hot-cut pelletizer for thermoplastics comprising a housing (31) having a wall defining an interior space (12) which is supplied with a polymer melt and channels (11) which pass radially through the housing wall (3) and form openings in the housing wall to convey the polymer melt out of the housing, cutters (5) which rotate in a substantially water-free space and slide over the openings (14) of the channels (11) along a cutting face (8) running around the housing wall (3) to cut the polymer melt into pellets and radially fling the pellets from the cutting face, and a ring of stationary cooling water nozzles (18) surrounding the housing wall to direct cooling water jets (19) onto the cutters (5) in the manner of a jacket over the cutting face (8) at such a small radial distance from the cutting face that the polymer melt is thereby cooled directly after leaving the cutting face (8) and at the same time the cutters (5) are cooled up to the cutting edges by the cooling water.

2. The pelletizer as claimed in claim 1, wherein the cutting face (8) of the housing wall (3) is of a cylindrical shape.

3. The pelletizer as claimed in claims 1 and 2, wherein axially directed electric heating cartridges (25) are fitted into the housing wall (3) between the channels (11).

4. The pelletizer as claimed in claim 3, wherein there are provided next to the heating cartridges (25) in each case a plurality of channels (11) lying substantially axially one behind the other.

5. A hot-cut pelletizer for thermoplastics comprising a housing (31) having a wall defining an interior space (12) which is supplied with a polymer melt and channels (11) which pass radially through the housing wall (3) and form openings in the housing wall to convey the polymer melt out of the housing, cutters (5) which rotate in a substantially water-free space and slide over the openings (14) of the channels (11) along a cutting face (8) running around the housing wall (3) to cut the polymer melt into pellets and radially fling the pellets from the cutting face, and a ring nozzle (30) surrounding the housing wall to direct cooling water (19) onto the cutters (5) in the manner of a jacket over the cutting face (8) at such a small radial distance from the cutting face that the polymer melt is thereby cooled directly after leaving the cutting face (8) and at the same time the cutters (5) are cooled up to the cutting edges by the cooling water.

* * * * *